(12) United States Patent
Bromberg et al.

(10) Patent No.: US 11,583,814 B2
(45) Date of Patent: Feb. 21, 2023

(54) DEVICE AND METHOD FOR IMPROVING SPECIFIC ENERGY REQUIREMENT OF PLASMA PYROLYZING OR REFORMING SYSTEMS

(71) Applicant: MAAT Energy Company, Cambridge, MA (US)

(72) Inventors: Leslie Bromberg, Sharon, MA (US); Kim-Chinh Tran, Cambridge, MA (US); Jorj Ian Owen, Dulles, VA (US); Jonathan Whitlow, Melbourne Beach, FL (US)

(73) Assignee: MAAT Energy Company, Cambridge, MA (US)

( * ) Notice: Subject to any disclaimer, the term of this patent is extended or adjusted under 35 U.S.C. 154(b) by 0 days.

(21) Appl. No.: 17/433,131

(22) PCT Filed: Feb. 25, 2020

(86) PCT No.: PCT/US2020/019689
§ 371 (c)(1),
(2) Date: Aug. 23, 2021

(87) PCT Pub. No.: WO2020/176496
PCT Pub. Date: Sep. 3, 2020

(65) Prior Publication Data
US 2022/0040656 A1  Feb. 10, 2022

Related U.S. Application Data

(60) Provisional application No. 62/810,524, filed on Feb. 26, 2019, provisional application No. 62/833,162, (Continued)

(51) Int. Cl.
*B01J 6/00* (2006.01)
*C01B 3/26* (2006.01)
(Continued)

(52) U.S. Cl.
CPC ............... *B01J 6/008* (2013.01); *B01J 4/001* (2013.01); *B01J 8/0278* (2013.01); *B01J 19/088* (2013.01);
(Continued)

(58) Field of Classification Search
CPC . B01J 6/008; B01J 4/001; B01J 8/0278; B01J 19/088; B01J 19/126; B01J 19/129;
(Continued)

(56) References Cited

U.S. PATENT DOCUMENTS 3,764,272 A * 10/1973 Sterling .................. B01J 12/007
219/121.36
3,875,068 A * 4/1975 Mitzel .................... B01J 19/126
422/906
(Continued)

FOREIGN PATENT DOCUMENTS

| CN | 101595439   | * 12/2009 | ................ C10J 3/86 |
| CN | 101595439 A | * 12/2009 | ................ C10J 3/86 |

(Continued)

OTHER PUBLICATIONS

International Search Report and Written Opinion dated May 18, 2020 in corresponding PCT application No. PCT/US2020/019689.
(Continued)

*Primary Examiner* — Kaity V Chandler
(74) *Attorney, Agent, or Firm* — Nields, Lemack & Frame, LLC

(57) ABSTRACT

Devices and methods for reducing the specific energy required to reform or pyrolyze reactants in plasmas operating at high flow rates and high pressures are presented. These systems and methods include 1) introducing electrons and/or easily ionized materials to a plasma reactor, 2) increasing turbulence and swirl velocity of the flows of feed gases to have improved mixing in a plasma reactor, and 3)
(Continued)

reducing slippage from a plasma reactor system. Such plasma systems may allow plasma reactors to operate at lower temperatures, higher pressure, with improved plasma ignition, increased throughput and improved energy efficiency. In preferred embodiments, the plasma reactors are used to produce hydrogen and carbon monoxide, hydrogen and carbon, or carbon monoxide through reforming and pyrolysis reactions. Preferred feedstocks include methane, carbon dioxide, and other hydrocarbons.

25 Claims, 13 Drawing Sheets

Related U.S. Application Data filed on Apr. 12, 2019, provisional application No. 62/847,986, filed on May 15, 2019.

(51) Int. Cl.
  *C01B 3/38* (2006.01)
  *B01J 19/08* (2006.01)
  *B01J 19/12* (2006.01)
  *B01J 19/24* (2006.01)
  *B01J 4/00* (2006.01)
  *B01J 8/02* (2006.01)

(52) U.S. Cl.
  CPC ......... *B01J 19/126* (2013.01); *B01J 19/129* (2013.01); *B01J 19/2405* (2013.01); *C01B 3/26* (2013.01); *C01B 3/382* (2013.01); *B01J 2219/00159* (2013.01); *B01J 2219/0847* (2013.01); *B01J 2219/0849* (2013.01); *B01J 2219/0892* (2013.01); *B01J 2219/0898* (2013.01); *C01B 2203/0205* (2013.01); *C01B 2203/0277* (2013.01); *C01B 2203/0861* (2013.01)

(58) Field of Classification Search
  CPC .......... B01J 19/2405; B01J 2219/00159; B01J 2219/0847; B01J 2219/0849; B01J 2219/0892; B01J 2219/0898; C01B 3/26; C01B 3/382; C01B 2203/0205; C01B 2203/0277; C01B 2203/0861
  See application file for complete search history.

(56) References Cited

U.S. PATENT DOCUMENTS

| | | | |
|---|---|---|---|
| 4,398,827 A | 8/1983 | Dietrich | |
| 4,801,435 A * | 1/1989 | Tylko | C03B 5/005 422/906 |
| 5,260,640 A | 11/1993 | Carabetta et al. | |
| 6,238,629 B1 * | 5/2001 | Barankova | F23J 15/025 422/186.04 |
| 6,383,554 B1 | 5/2002 | Chang et al. | |
| 6,409,851 B1 * | 6/2002 | Sethuram | B22F 9/305 118/723 MW |
| 8,734,643 B2 | 5/2014 | Foret | C02F 1/006 210/243 |
| 2003/0024806 A1 * | 2/2003 | Foret | H05H 1/44 422/186 |
| 2003/0221949 A1 * | 12/2003 | Rabinovich | F02M 27/042 422/186.04 |
| 2004/0251241 A1 * | 12/2004 | Blutke | C01B 3/342 48/197 R |
| 2007/0160511 A1 * | 7/2007 | Rabinovich | B01J 19/088 422/186 |
| 2007/0183959 A1 * | 8/2007 | Charlier | C01B 32/164 204/173 |
| 2008/0033065 A1 * | 2/2008 | Haynes | C01B 13/0229 518/702 |
| 2008/0075649 A1 | 3/2008 | Hung et al. | |
| 2008/0093583 A1 * | 4/2008 | van den Oosterkamp | B01J 8/067 252/373 |
| 2009/0049748 A1 * | 2/2009 | Day | C10J 3/48 48/77 |
| 2009/0056222 A1 * | 3/2009 | Gutsol | C10J 3/18 48/65 |
| 2009/0060805 A1 * | 3/2009 | Muradov | B01J 8/12 422/600 |
| 2010/0003556 A1 | 1/2010 | Hartvigsen et al. | |
| 2010/0044483 A1 * | 2/2010 | Foret | H01J 37/32009 241/39 |
| 2010/0270142 A1 * | 10/2010 | Kong | C01B 32/97 204/173 |
| 2010/0314788 A1 * | 12/2010 | Hung | C01B 13/30 425/6 |
| 2011/0297623 A1 * | 12/2011 | Foret | C02F 1/006 204/157.5 |
| 2011/0300029 A1 * | 12/2011 | Foret | B01J 19/088 422/186.21 |
| 2011/0303532 A1 * | 12/2011 | Foret | A23C 3/073 422/186.21 |
| 2012/0020844 A1 | 1/2012 | Foret | |
| 2012/0024718 A1 * | 2/2012 | Foret | C02F 11/004 205/687 |
| 2012/0034137 A1 * | 2/2012 | Risby | H01J 37/32357 422/186.29 |
| 2012/0323060 A1 * | 12/2012 | Carabin | H05H 1/34 422/162 |
| 2013/0081957 A1 * | 4/2013 | Foret | B01J 19/128 204/554 |
| 2013/0331622 A1 * | 12/2013 | McAlister | C01B 3/26 423/437.1 |
| 2014/0048516 A1 * | 2/2014 | Gorodetsky | B01J 19/088 219/121.51 |
| 2014/0054504 A1 * | 2/2014 | Yoon | C01B 3/34 252/373 |
| 2014/0210344 A1 * | 7/2014 | Foret | C01B 3/342 315/111.11 |
| 2014/0217630 A1 | 8/2014 | Redjdal et al. | |
| 2014/0275298 A1 * | 9/2014 | Hirson | C01B 3/042 422/186.21 |
| 2014/0299459 A1 * | 10/2014 | Foret | B01J 19/129 201/19 |
| 2014/0332724 A1 * | 11/2014 | Tsangaris | C01B 3/22 422/643 |
| 2015/0210858 A1 * | 7/2015 | Hoermann | C09C 1/48 422/150 |
| 2016/0152480 A1 * | 6/2016 | Jang | B01J 19/088 204/157.43 |
| 2017/0141000 A1 * | 5/2017 | Sakiyama | C23C 16/50 |
| 2017/0291860 A1 * | 10/2017 | Bedard | C10G 50/00 |
| 2019/0046947 A1 * | 2/2019 | Strohm | C01B 32/184 |
| 2019/0047865 A1 * | 2/2019 | Zeller | B01J 19/129 |

FOREIGN PATENT DOCUMENTS

| | | | | |
|---|---|---|---|---|
| CN | 103958398 | * | 7/2014 | ........ B01D 53/1462 |
| CN | 103958398 A | * | 7/2014 | ........ B01D 53/1462 |
| CN | 108744903 A | | 11/2018 | |
| CN | 108889115 A | | 11/2018 | |
| DE | 211457 A3 | | 7/1984 | |
| EP | 0616599 B1 | | 2/1996 | |

OTHER PUBLICATIONS

European communication dated Oct. 18, 2022 in corresponding European patent application No. 20763001.3.

* cited by examiner

DEVICE AND METHOD FOR IMPROVING SPECIFIC ENERGY REQUIREMENT OF PLASMA PYROLYZING OR REFORMING SYSTEMS

CLAIM OF PRIORITY

This disclosure claims priority to U.S. Provisional Application Nos. 62/810,524, 62/833,162, and 62/847,986. The disclosures of each priority application are fully incorporated by reference.

STATEMENT OF GOVERNMENT-SPONSORED RESEARCH

This invention was made with government support under grant number DE-SC0019791, awarded by the United States Department of Energy, Small Business Innovation Research. The government has certain rights in the invention.

FIELD OF INVENTION

The present invention relates generally to reducing the specific energy required to reform or pyrolyze reactants in plasmas operating at high flow rates and high pressures. In addition, it is desired to decrease the power of the entire system. Systems and methods for 1) introducing electrons and/or easily ionized materials to a plasma reactor, 2) increasing turbulence and swirl velocity of the flows of feed gases to have improved mixing in a plasma reactor, 3) increasing the operating pressure and the pressure of the generated products, and 4) reducing slippage from a plasma reactor are disclosed.

BACKGROUND OF THE INVENTION

Plasma reactor systems can be used to reform or pyrolyze a feedstock of reactants into a molecularly different product. For industrial applications it is desirable to operate plasma reactor systems at high flow rate, high pressures, and power with low specific energy input.

As the flow rate increases at a given power, the energy/mass ratio is decreased, resulting in lower temperatures that can cause the plasma to become unstable. Similarly, as pressure increases at a given power, the mean free path of electrons decreases and plasmas can become unstable. Currently, to maintain a plasma at high pressures and/or high flow rate, additional energy is applied, which results in higher plasma temperatures. Higher temperature plasmas result in a higher concentration of electrons which increases the stability of the plasma.

Often the temperature at which a high pressure and/or high flow rate plasma is stable is higher than the temperature actually required to reform or pyrolyze the reactants. In such cases, energy in excess of that required for reforming or pyrolyzing reactants is used, leading to lower energy efficiencies. Further, high temperatures can be difficult to contain, operating at temperatures greater than that required may shorten the life of the equipment and limit the materials which can be used to construct the reactor, and the products may need to be cooled prior to further downstream processing.

SUMMARY OF THE INVENTION

To allow plasma reactor systems to operate at lower temperatures with greater energy efficiency, electrons, easily ionizable materials, or both electrons and easily ionizable materials are fed into the plasma reactor. Electrons tend to be the absorber of much of the energy applied, thus increasing the electron concentration may simplify ignition and improve plasma stability. Introducing easily ionizable materials, materials with low breakdown voltage, such as alkali salt and/or alkaline metals, or low ionization potential molecules, such as TDAE (Tetrakis(dimethylamino)ethylene) and similar molecules, to the plasma reactor will increase the number of electrons (absorbers) in the plasma chamber at a given temperature, as these materials ionize at temperatures lower than the molecules generally found in the reactant feedstocks. Thus, a lower temperature plasma can be catalyzed or seeded to have the same electron (absorber) density as a higher temperature plasma. Alternatively, solids can be introduced into the discharge that would result in reduced temperatures for processing and plasma breakdown and maintenance. Solids could be metallic nanoparticles with sharp edges, or carbon solids (such as carbon black). In addition to aiding in breaking the gas, maintenance of the discharge, they can also take part in the chemical processes, for example, as nucleation sites for formation of solids (for example, in the pyrolysis of methane).

Catalyzing or seeding the reactor with low voltage breakdown materials or electrons will allow operation at lower temperatures with improved plasma stability. This in turn will allow plasma operation at higher flow rates and/or higher pressures. This increase in throughput can result in a higher energy efficiency, as less energy goes into heating the reactants to temperatures in excess to those required for the reaction.

Good reactant mixing is also key to being able to operate at lower temperatures. To encourage thorough mixing, a "tornado" gas inlet is introduced, which results in an increased swirl velocity. The tornado gas inlet results in turbulent mixing which leads to more homogeneous temperatures and encourages product formation.

Additionally, operating at lower plasma temperatures will allow the use of a catalyst bed in close proximity to the plasma, as the product temperature will not have to cool or not have to cool as much to be below the melting temperature of the catalyst. Including a catalyst can encourage the conversion of any remaining reactants into the target product. Thus, increasing energy efficiency and product throughput while decreasing reactant slippage.

To reduce waste production, reduce feedstock consumption, and generally increase energy efficiency, tail gas which may be produced in downstream processes can be recycled back to the plasma reactor. Using and combining these techniques will lead to reduced specific energy requirements in plasma reactor systems.

Compression of the reagents is easier than compression of the product gases, and thus, operating at higher inlet pressure is desirable. Plasma operation at high pressure is challenging. Means of operating at higher pressure are described.

BRIEF DESCRIPTION OF THE DRAWINGS

To better illustrate the invention and to aid in a more thorough description which provides other advantages and objectives of the invention the following drawings are referenced. It is noted that these embodiments are specific examples of the invention and not to be understood as limiting cases for the scope of this invention. The drawings are as follows.

DETAILED DESCRIPTION OF THE INVENTION

Figure 1:
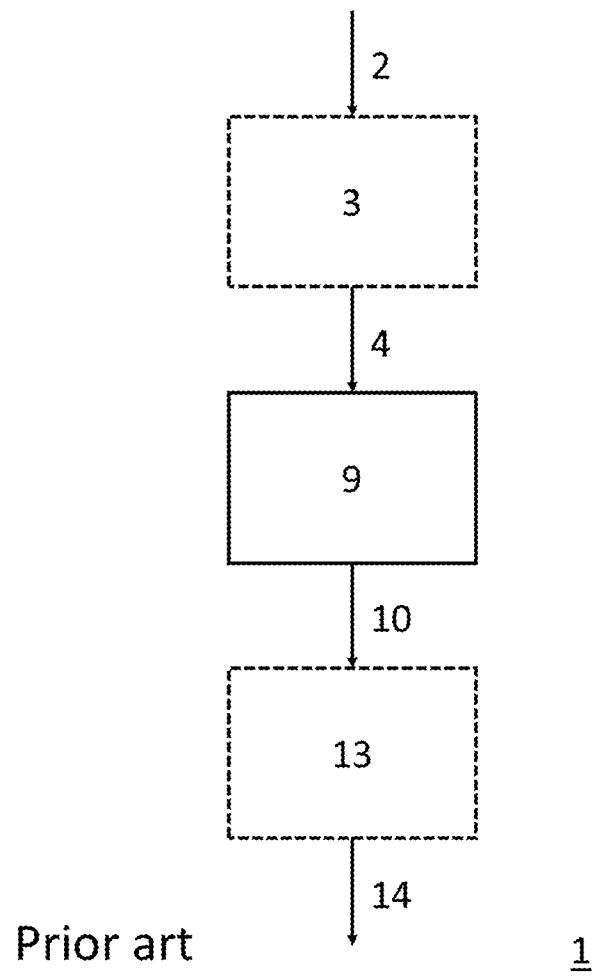
FIG. 1: Block diagram of a plasma reactor according to the prior art.

FIG. 1 gives a block diagram of a plasma reactor according to the prior art 1. Reactants 2 are fed to an optional pre-plasma conditioning unit 3. The pre-plasma conditioning unit 3 may perform processes that include gas cleaning, molecule scrubbing, pre-heating, or a variety of other processes known to those skilled in the art. Pre-conditioned reactants 4 exiting the optional pre-plasma conditioning unit 3 then flow into a plasma reactor 9. In the plasma reactor 9 the molecular makeup of the pre-conditioned reactants 4 are altered, forming an initial product and slippage 10 that has a molecularly different makeup. The initial product and slippage 10 then flows into an optional post-plasma conditioning/processing unit 13. The post-plasma conditioning/processing unit 13 may perform processing that include gas cleaning, molecule scrubbing, heat recovery, gas compression, product separation, gas supplementation, Fischer-Tropsch processes, as well as other processes known to those of ordinary skill in the art. A final product 14 flows out of the optional post-plasma conditioning/processing unit 13.

If the optional pre-plasma conditioning unit 3 is omitted, then the pre-conditioned reactants 4 are equivalent to the reactants 2. Similarly, if the optional post-plasma conditioning/processing unit 13 is omitted, then final product 14 is equivalent to the initial product and slippage 10.

As discussed above, plasma reactors according to the prior art 1, especially those operating at atmospheric pressure and above, tend to operate at temperatures higher than that required for driving the reactions alone. The excess temperatures are required in order to maintain the stability of the plasma. The following embodiments of the invention present methods for decreasing the specific energy requirement for reforming by 1) increasing the conductivity of the reactants, 2) increasing turbulence mixing, and 3) reducing slippage.

Embodiment 1

Figure 2:
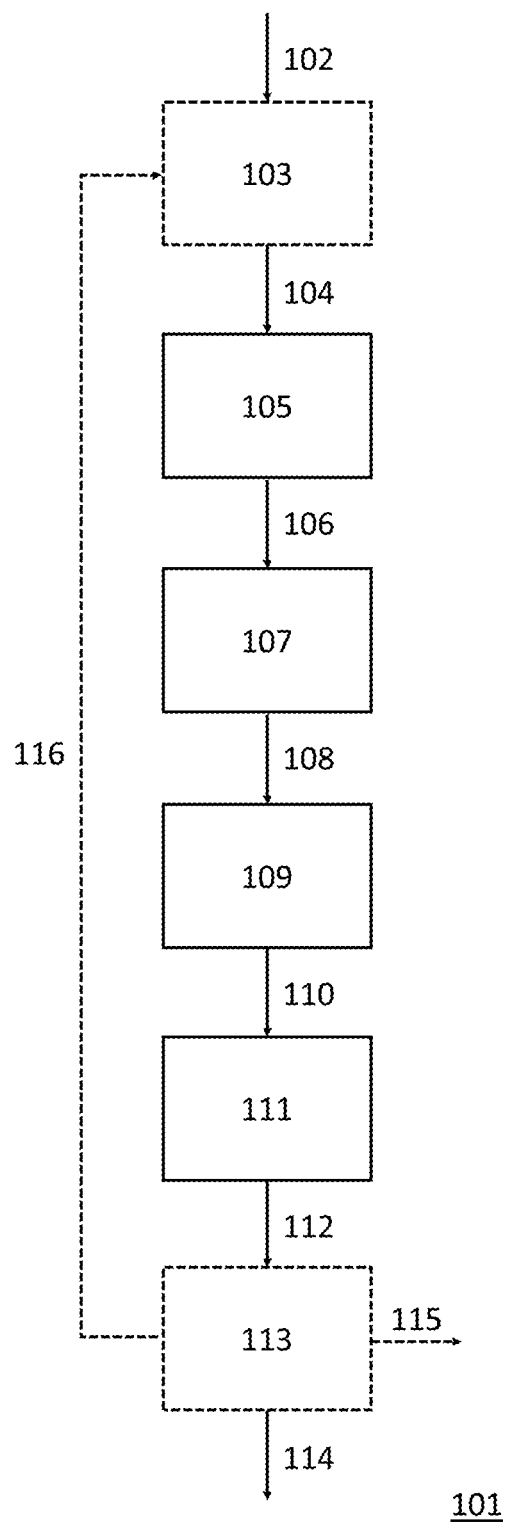
FIG. 2: Block diagram of an electron seeded plasma reactor according to the first embodiment.

FIG. 2 gives a block diagram of an electron seeded plasma reactor according to the first embodiment 101. Reactants 102 are fed to an optional pre-plasma conditioning unit 103. The pre-plasma conditioning unit 103 may perform processes that include gas cleaning, molecule scrubbing, pre-heating, or a variety of other processes. Pre-conditioned reactants 104 exiting the optional pre-plasma conditioning unit 103 then flow into a catalyzing or seeding unit 105 where electrons and/or easily ionizable materials are added into the pre-conditioned reactants 104 forming catalyzed or seeded reactants 106. In this disclosure, the term "easily ionizable materials" is defined as those atoms and molecules having an ionization energy less than 5.5 eV. The catalyzed or seeded reactants 106 flow into a tornado inlet unit 107 where high swirl velocities are imparted forming reactants with a high swirl velocity 108. The reactants with a high swirl velocity 108 enter the plasma reactor 109. In the plasma reactor 109, the molecular makeup of the reactants with high swirl velocity 108 is altered, forming an initial product and slippage 110 having a molecularly different makeup. The initial product and slippage 110 flows into a second stage reactor unit 111 where additional product is formed from the slippage in the product and slippage 110. Initial product 112 flows out of the second stage reactor unit 111 and into an optional post-plasma conditioning/processing unit 113. The post-plasma conditioning/processing unit 113 may perform processes that include gas cleaning, molecule scrubbing, heat recovery, gas compression, product separation, gas supplementation, Fischer-Tropsch processes, as well as other processes known to those of ordinary skill in the art. The final product 114 exits the optional post-plasma conditioning/processing unit 113. Optionally, non-recycled waste 115 and tail gas 116 may be produced in the post-plasma conditioning/processing unit 113. As shown in FIG. 2, the tail gas 116 can be reinjected with the reactants 102 into the optional pre-plasma conditioning unit 103. It is worth noting that depending on the composition of the tail gas 116 it could also be reintroduced in the catalyzing or seeding unit 105, the tornado inlet unit 107, or directly into the plasma reactor 109.

The addition of the catalyzing or seeding unit 105, the tornado inlet unit 107, and the second stage reactor unit 111 enable plasma-based reformation or pyrolysis with a decreased specific energy requirement. The presence of the electrons and/or easily ionizable materials introduced in the catalyzing or seeding unit 105 will allow the plasma reactor 109 to operate at lower temperatures or higher pressures while maintaining or improving the stability of the plasma. A stable lower temperature plasma will allow increased throughput for a given power, resulting in a decrease in the specific energy requirement for processing gases (i.e. higher energy efficiency). Further the presence of electrons and/or easily ionizable materials may simplify ignition as more absorbers are present.

The inclusion of the tornado inlet unit 107 will introduce turbulence into the plasma reactor 109. A turbulent flow will improve the mixing of the gases in the plasma reactor 109. This in turn will encourage product formation and reduce temperature gradients forming within the plasma reactor 109. The more homogeneous temperature and improved mixing will reduce the fraction of the gases that pass through the plasma reactor 109 without being reformed or pyrolyzed. Thus, minimizing the amount of slippage within the initial product and slippage 110.

The inclusion of the second stage reactor unit 111 encourages the formation of additional initial product in the initial product and slippage 110. The second stage reactor unit 111 may include a catalyst bed. The catalyst bed in the second stage reactor unit 111 encourages additional initial product formation by 1) being composed of a catalyst which encourages the desired initial product formation, and 2) further improving the mixing of the gases and reducing temperature gradients within the gases by flowing through the bed.

If the optional pre-plasma conditioning unit 103 is omitted, then the pre-conditioned reactants 104 are equivalent to the reactants 102. Similarly, if the optional post-plasma conditioning/processing unit 113 is omitted, then the final product 114 is equivalent to the initial product 112.

Example Materials and Construction for Embodiment 1

The plasma reactor system according to the first embodiment 101, may use reactants 102, pre-conditioned reactants 104, and tail gas 116 comprising nitrogen, oxygen, argon, helium, neon, hydrogen, chlorine, fluorine, ammonia, carbon dioxide, carbon monoxide, hydrogen chloride, nitrous oxide, nitrogen trifluoride, sulfur dioxide, sulfur hexafluoride, methane, acetylene, ethane, ethene, propane, propene, butane, butene, gasoline, diesel, kerosene, other hydrocarbons, chlorofluorocarbons, methanol, ethanol, propanol, butanol, other alcohols, air, water, or combinations thereof. Preferably the reactants 102, pre-conditioned reactants 104, and tail gas 116 include at least (1) methane, (2) carbon dioxide, (3) carbon dioxide and methane, (4) water and methane, (5) carbon dioxide and water, or (6) hydrogen.

As previously mentioned, the pre-plasma conditioning unit 103 may include gas cleaning, molecule scrubbing, pre-heating, or a variety of other processes.

The catalyzing or seeding unit 105, which provides the electrons and/or easily ionizable materials, may include a mass flow controller or controlled injector or nebulizer configured to inject a controlled amount of an alkali salt within a solvent solution or aerosol propellant, or an easily ionizable organic molecule such as TDAE (Tetrakis(dimethylamino)ethylene).

The solvent or propellant used may include water, ethanol, cyclohexane, heptane, benzene, turpentine, methanol, hexane, chloroform, pentane, toluene, alcohols, acetone, chlorofluorocarbons, propane, butane, isobutane, dimethyl ether, methyl ethyl ether, nitrous oxide, carbon dioxide, hydrofluoroalkanes, and hydrofluoroolefins. The alkali salt may include sodium carbonate, sodium bicarbonate, sodium hydroxide, sodium nitrate, lithium hydroxide, lithium nitride, lithium carbonate, potassium oxide, potassium hydroxide, potassium carbonate, cesium carbonate, cesium oxide, cesium nitrate, cesium hydroxide, calcium hydroxide, calcium nitride, calcium carbonate, sodium nanoparticles, potassium nanoparticles, cesium nanoparticles, and calcium nanoparticles, sodium chloride, potassium dichromate, calcium chloride, and/or sodium bisulfate.

Solids such as metallic nanoparticles with sharp edges, or carbon solids (such as carbon black) could also be fed in a controlled manner. Further, such particles may serve as nucleation sites for formation of solids (for example, in the pyrolysis of methane).

The catalyzing or seeding unit 105 may also include a thermionic emitter, cathode ray tubes, glow discharge, dielectric barrier discharge, microwave discharge, radio frequency discharge, corona discharge, electric arc discharge, inclusion of reactor lined with a radioactive material that undergoes beta decay (such as nickel-63) or alpha decay (such as americium-241), laser ablation of a target comprising alkali and/or alkaline metals, sputtering from a target comprising alkali and/or alkaline metals, and/or evaporation of a material comprising alkali and/or alkaline metals.

The catalyzing or seeding unit 105 may also include electrospray ionization. Preferably, the charges in the aerosols are negative. Although the negative charges are on ions out of the unit, when the aerosols enter the heated region of the outer plasma, the negatively ionized ions would easily dissociate generating free electrons. It may be possible to use a solution of alkali material in the liquid used for electrospray. In this case, the electrospray introduces both easily ionized negative ions as well as easily ionized alkali atoms.

Preferably the catalyzing or seeding unit 105 is a mass flow controller or controlled injector configured to inject a controlled amount of an alkali salt within a solvent solution or aerosol propellant, low ionization potential molecules, or a solid feed.

Preferably the alkali salt includes lithium, sodium, potassium, rubidium, cesium, and/or calcium. More preferably the alkali salt includes sodium, potassium, and/or cesium. In these more preferred cases the preferred alkali salts are sodium carbonate, sodium bicarbonate, sodium hydroxide, potassium hydroxide, potassium carbonate, cesium carbonate, and/or cesium hydroxide. In more preferred cases where sodium is used, the sodium molar fraction in the total feed entering the plasma reactor 109 is preferably between 0.01 and 1%, more preferably between 0.05 and 0.5%. In more preferred cases where potassium is used, the potassium molar fraction in the total feed entering the plasma reactor 109 is preferably between 0.0001 and 0.01%, more preferably between 0.0005 and 0.005%. In more preferred cases where cesium is used, the cesium molar fraction in the total feed entering the plasma reactor 109 is preferably between 0.00001 and 0.001%, more preferably between 0.00005 and 0.0005%.

Figure 3:
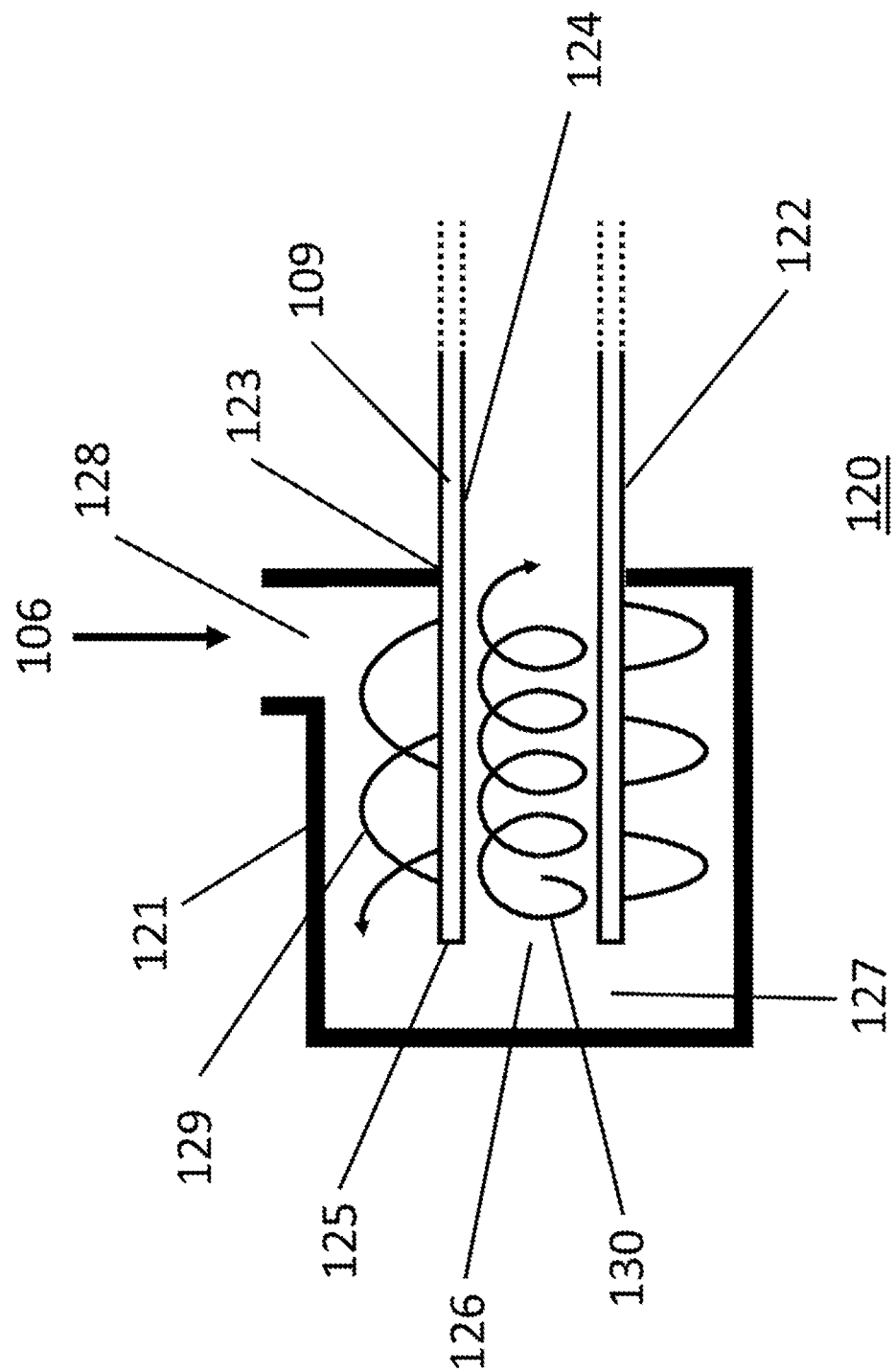
FIG. 3: Cross-sectional view of a first example tornado inlet unit.

FIG. 3 gives a cross-sectional view of a first example tornado inlet unit 120 which may serve as the tornado inlet unit 107. In this example, the tornado chamber wall 121 surrounds and is in contact with an outer surface 122 of the plasma reactor, forming an air tight junction 123. The inner surface 124 of the plasma reactor has a smaller diameter than the outer surface 122 of the plasma reactor, and these surfaces extend into the region enclosed by the tornado chamber wall 121, ending at a top surface 125 of the plasma reactor. The dots extending past the outer surface 122 of the plasma reactor and the inner surface 124 of the plasma reactor indicate that the plasma reactor 109 may continue, only the portion pertinent the tornado inlet unit 107 is shown. The portion of the plasma reactor shown is radially symmetric, the opening adjacent to the top surface 125 of the plasma reactor along the inner surface 124 of the plasma reactor forms an inlet 126 to the plasma reactor. A gap 127 exists between the top surface 125 of the plasma reactor and the tornado chamber wall 121. Catalyzed or seeded reactants 106 enter the chamber created by the tornado chamber wall 121 and the outer surface 122 of the plasma reactor through a tornado chamber inlet 128. The tornado chamber inlet 128 is oriented such that the catalyzed or seeded reactants 106 entering have a large radius swirl motion 129. The swirl motion in this region has a first swirl velocity. As the catalyzed or seeded reactants 106 enter the inlet 126 to the plasma reactor the gases are confined to a small radius swirl motion 130, wherein the swirl motion in this region has a second swirl velocity. To conserve angular momentum when going from the large radius swirl motion 129 to the small radius swirl motion 130, the radial velocity must increase. The larger radial velocities in the regions with small radius swirl motion 130 can lead to turbulent flows which will result in good reactant mixing and more homogeneous temperatures.

Figure 4:
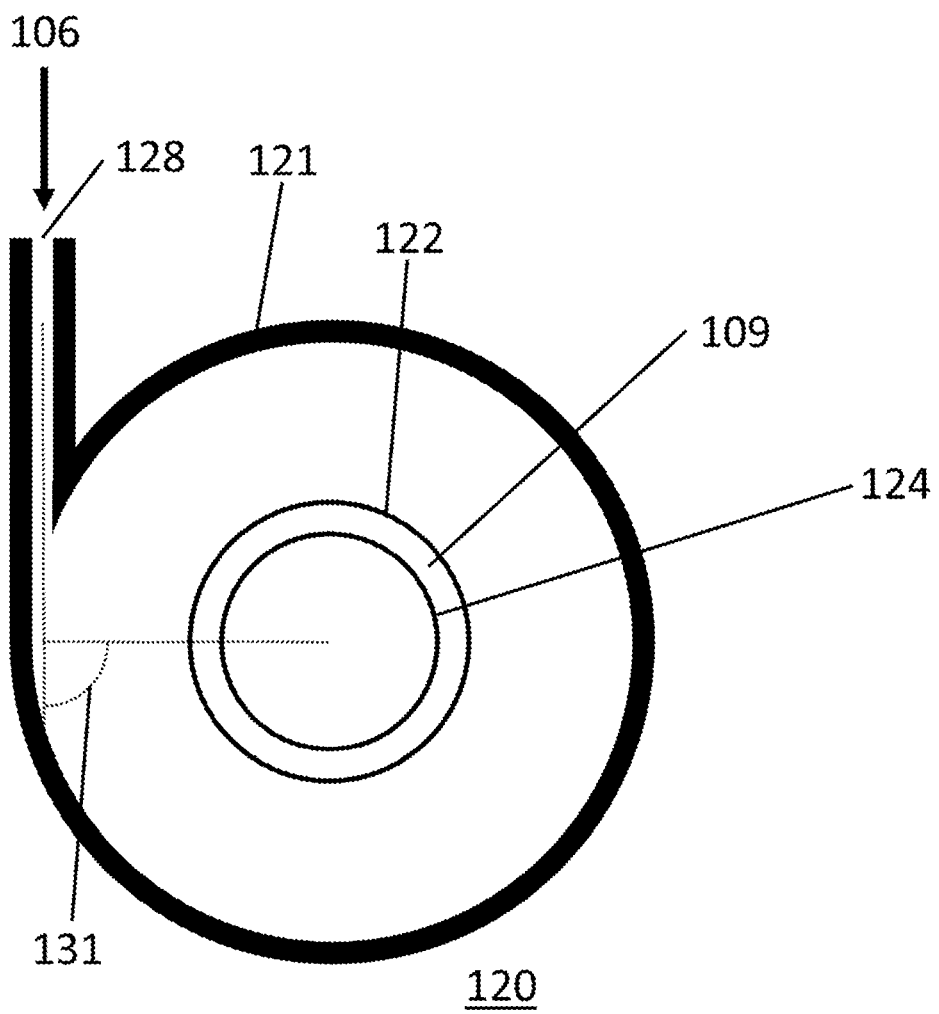
FIG. 4: Cross-sectional view of a first example tornado inlet unit perpendicular the axis through the tornado chamber inlet.

FIG. 4 give a cross-sectional view of a first example tornado inlet unit 120 perpendicular the axis through the center of the tornado chamber inlet 128. Catalyzed or seeded reactants 106 are injected through the tornado chamber inlet 128 in a manner such that a swirl velocity is imparted, in other words an azimuth angle 131 is included (the tornado chamber inlet 128 is not directed directly towards the central axis). Preferably the azimuth angle 131 is between 30 and 90 degrees. While a single tornado chamber inlet 128 is shown in FIG. 4, multiple tornado chamber inlets 128 could be included. In the case where multiple tornado chamber inlets 128 are included the azimuth angle 131 from one inlet to another may differ.

The first example tornado inlet unit 120 which may serve as the tornado inlet unit 107 has the added benefit that if the plasma was generated within the area enclosed by the plasma reactor 109 where the small radius swirl motion 130 is shown, heat could be transferred through the walls of the plasma reactor 109. The hotter inner surface 124 of the plasma reactor could be cooled from the cooler catalyzed or seeded reactants 106 incident along the outer surface 122 of the plasma reactor. This may help protect the plasma reactor 109 from melting. Similarly, the cooler catalyzed or seeded reactants 106 could be preheated by absorbing energy from the outer surface 122 of the plasma reactor, thus reducing the energy that needs to be delivered within the plasma reactor 109 in order to reform or pyrolyze, thereby increasing efficiency.

Figure 5:
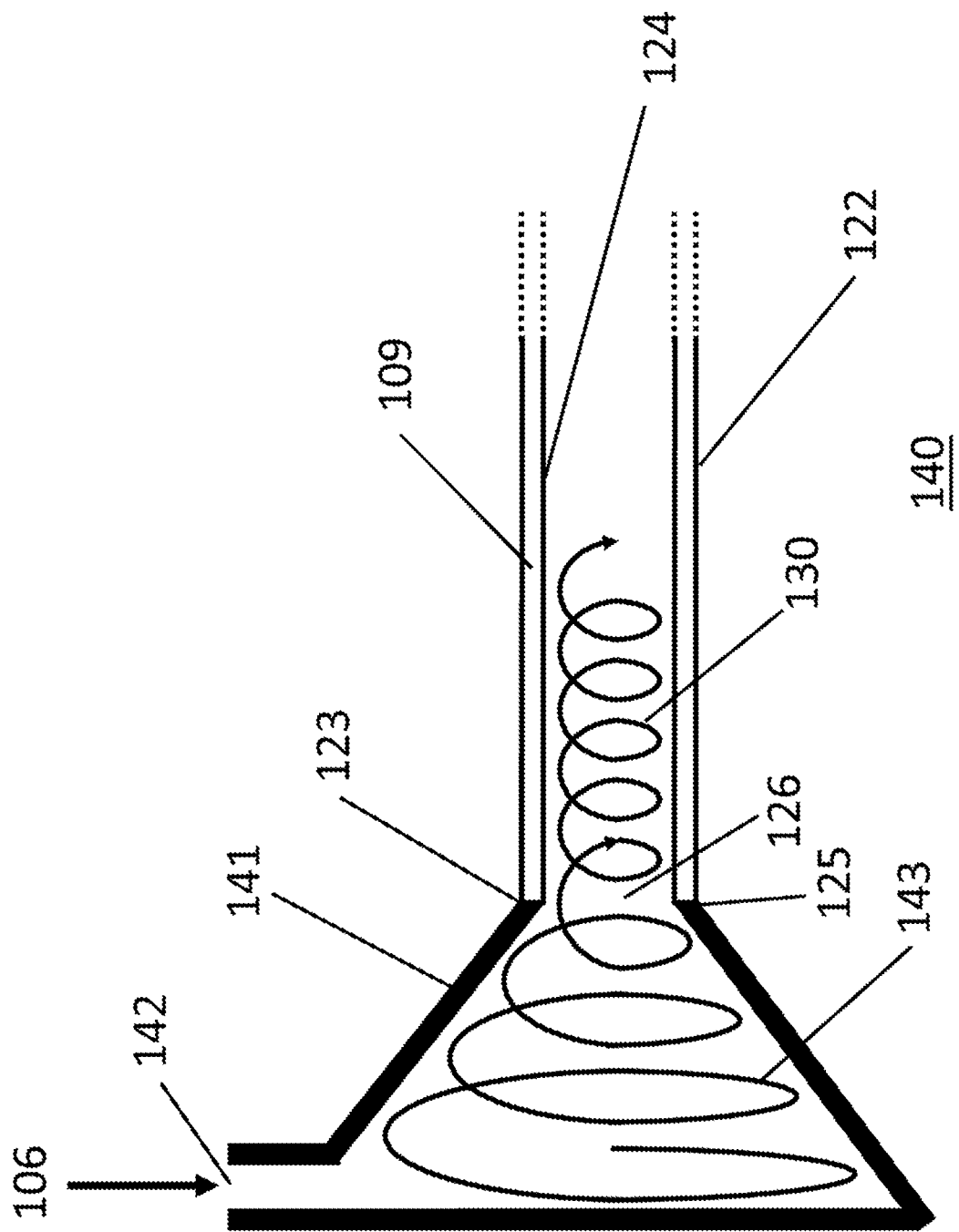
FIG. 5: Cross-sectional view of a second example tornado inlet unit.

FIG. 5 gives a cross-sectional view of a second example tornado inlet unit 140 which may serve as the tornado inlet unit 107. In this example, a funnel-type tornado chamber wall 141 contacts the plasma reactor 109, forming an air tight junction 123. The inner surface 124 of the plasma reactor has a smaller diameter than the outer surface 122 of the plasma reactor, with these surfaces ending at a top surface 125 of the plasma reactor. The dots extending past the outer surface 122 of the plasma reactor and the inner surface 124 of the plasma reactor indicate that the plasma reactor 109 may continue, however only the portion pertinent the tornado inlet unit 107 is shown. The portion of the plasma reactor shown is radially symmetric, the opening adjacent to the top surface 125 of the plasma reactor along the inner surface 124 of the plasma reactor forms an inlet 126 to the plasma reactor. Catalyzed or seeded reactants 106 enter the chamber created by the funnel-type tornado chamber wall 141 through a funnel-type tornado chamber inlet 142. The funnel-type tornado chamber inlet 142 is oriented such that the catalyzed or seeded reactants 106 entering have a swirl motion. A tapering swirl motion 143 occurs as the funnel-type tornado chamber wall 141 taper inward toward the inlet 126 to the plasma reactor. As the catalyzed or seeded reactants 106 enter the inlet 126 to the plasma reactor the gases are confined to a small radius swirl motion 130. To conserve angular momentum the swirl velocity of the catalyzed or seeded reactants 106 increases as funnel-type tornado chamber wall 141 tapers, the larger swirl velocities are maintained in the regions with small radius swirl motion 130 leading to turbulent flows which will result in good reactant mixing and more homogeneous temperatures within the plasma reactor 109.

Figure 6:
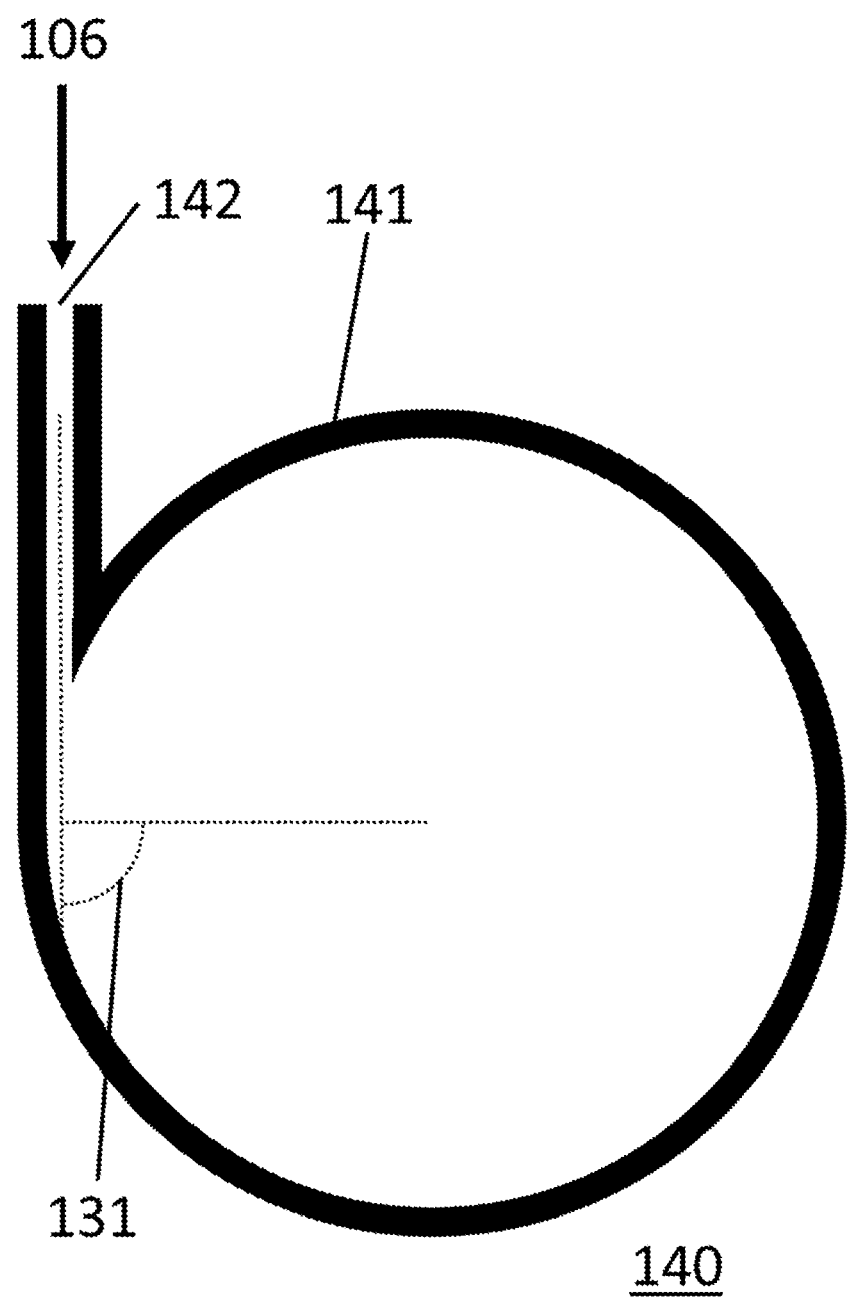
FIG. 6: Cross-sectional view of a first example tornado inlet unit perpendicular the axis through the tornado chamber inlet.

FIG. 6 give a cross-sectional view of a second example tornado inlet unit 140 perpendicular the axis through the center of the funnel-type tornado chamber inlet 142. Catalyzed or seeded reactants 106 are injected through the funnel-type tornado chamber inlet 142 in a manner such that a swirl velocity is imparted, in other words an azimuth angle 131 is included (the funnel-type tornado chamber inlet 142 is not directed directly towards the central axis). Preferably the azimuth angle 131 is between 30 and 90 degrees. While a single funnel-type tornado chamber inlet 142 is shown in FIG. 6, multiple funnel-type tornado chamber inlets 142 could be included. In the case where multiple funnel-type tornado chamber inlets 142 are included, the azimuth angle 131 from one inlet to another may differ.

Preferably the tornado inlet unit 107 yield swirl velocities greater than 0.5 m/s. More preferably the tornado inlet unit 107 yield swirl velocities greater than 2 m/s.

The plasma reactor 109 contains an energy source which may be a DC glow discharge, radio frequency discharge, arc discharge, corona discharge, dielectric barrier discharge, microwave discharge, AC discharge, or a gliding arc discharge. Preferably energy source in the plasma reactor 109 is a microwave discharge.

Figure 7:
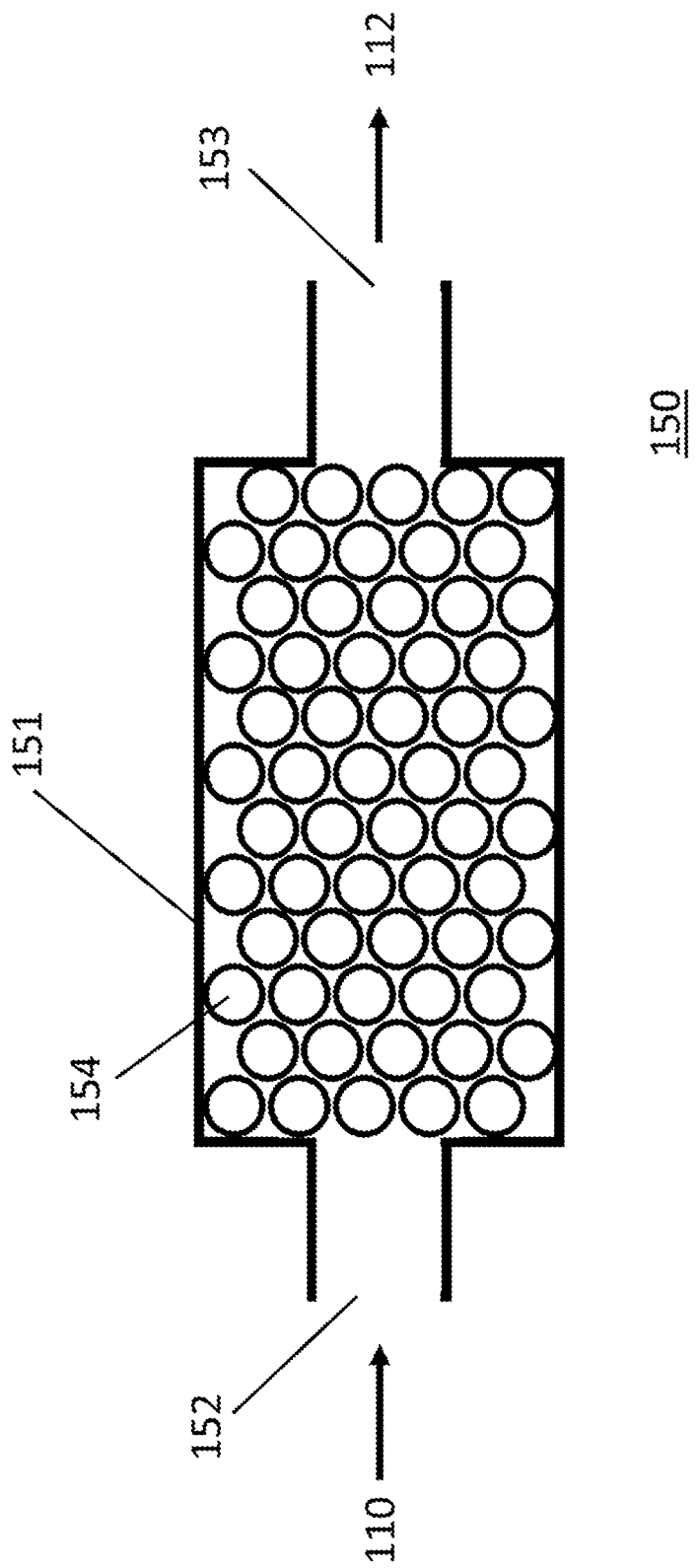
FIG. 7: Cross-sectional view of a first example second stage reactor unit.

As previously mentioned, the second stage reactor unit 111 may include a catalyst bed. FIG. 7 provides cross-sectional view of a first example second stage reactor unit 150 which may serve as a second stage reactor unit 111. The first example second stage reactor unit 150 is made up of a second stage reactor wall 151 which forms an enclosed reactor chamber. Initial product and slippage 110 flow into the first example second stage reactor unit 150 through a second stage reactor inlet 152. Initial product 112 flows out of the first example second stage reactor unit 150 through a second stage reactor outlet 153. The enclosed reactor formed by the second stage reactor wall 151 contains a catalyst bed 154.

The catalyst bed 154 in the first example second stage reactor unit 150 encourages additional initial product 112 formation by 1) being composed of a catalyst which encourages the desired initial product formation, and 2) further improving the mixing of the gases and reducing temperature gradients within the gases by flowing through the catalyst bed 154. The catalyst used in the catalyst bed may contain nickel, platinum, ruthenium, rhodium, palladium, silver, osmium, iridium, gold, copper, alumina, vanadium, iron, aluminosilicates, zeolites, and/or rhenium. If the first example second stage reactor unit 150 is used as the second stage reactor unit 111 the catalyst bed 154 preferably contains nickel.

A second stage reactor unit 111 that includes a catalyst bed 154 such as that described in the first example second stage reactor unit 150 above would be especially applicable for co-reforming carbon dioxide and methane or water and methane. Any slipped reactants could be encouraged to reform into carbon monoxide and hydrogen by including a catalyst bed 154 that comprises nickel.

As mentioned previously, the optional post-plasma conditioning/processing unit 113 may perform processes that include gas cleaning, molecule scrubbing, heat recovery, gas compression, product separation, gas supplementation, and further processing, such as Fischer-Tropsch processes, as well as other processes known to those of ordinary skill in the art. Preferably, tail gas 116 is recycled in order to reduce waste and improve mass conversion.

The initial product and slippage 110, initial product 112, and the final product 114 may include nitrogen, oxygen, argon, helium, neon, hydrogen, chlorine, fluorine, ammonia, carbon dioxide, carbon monoxide, hydrogen chloride, nitrous oxide, nitrogen trifluoride, sulfur dioxide, sulfur hexafluoride, methane, acetylene, ethane, ethene, propane, propene, butane, butene, gasoline, diesel, kerosene, other hydrocarbons, chlorofluorocarbons, methanol, ethanol, propanol, butanol, other alcohols, air, water, carbon black, carbon nanotubes, or combinations thereof. Preferably the initial product 112 include at least (1) hydrogen and carbon (carbon black, carbon nanotubes, and/or soot), (2) carbon monoxide and hydrogen, or (3) carbon monoxide.

The operating pressure of the plasma reactor system is preferably between 0.1 and 10 atm. More preferably the operating pressure is between 0.95 and 5 atm.

Embodiment 2

Figure 8:
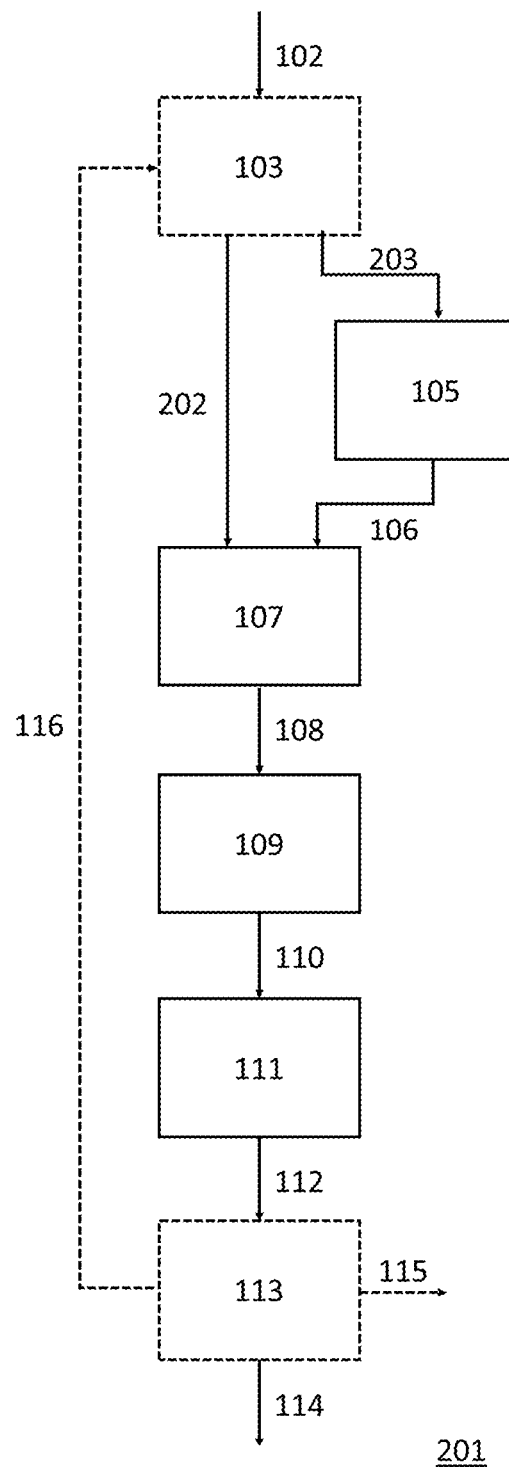
FIG. 8: Block diagram of an electron seeded plasma reactor according to the second embodiment.

FIG. 8 gives a block diagram of an electron seeded plasma reactor according to the second embodiment 201. The seeded plasma reactor according to the second embodiment 201 is very similar to that of the first 101. Elements with the same number fill a similar role as that those in the first embodiment. The focus will be on the differences in this particular embodiment.

In the electron seeded plasma reactor according to the second embodiment 201, not all pre-conditioned reactants 104 (in FIG. 2) pass through the catalyzing or seeding unit 105. Instead, a first portion of pre-conditioned reactants 202 bypass the catalyzing or seeding unit 105 and go to the tornado inlet unit 107. A second portion of pre-conditioned reactants 203 flow to the catalyzing or seeding unit 105 where electrons and/or easily ionizable materials are added into the second portion of pre-conditioned reactants 203 forming catalyzed or seeded reactants 106. The catalyzed or seeded reactants 106 then flow to the tornado inlet unit 107.

Example Materials and Construction for Embodiment 2

Unless otherwise stated, the electron seeded plasma reactor according to the second embodiment 201 may use the same example materials and construction as those disclosed for the electron seeded plasma reactor according to the first embodiment 101. Since the first portion of pre-conditioned reactants 202 and the catalyzed or seeded reactants 106 are separately fed to the tornado inlet unit 107 alternative configurations for the tornado inlet unit can be used. Additional example tornado inlet units 107 will be disclosed.

Figure 9:
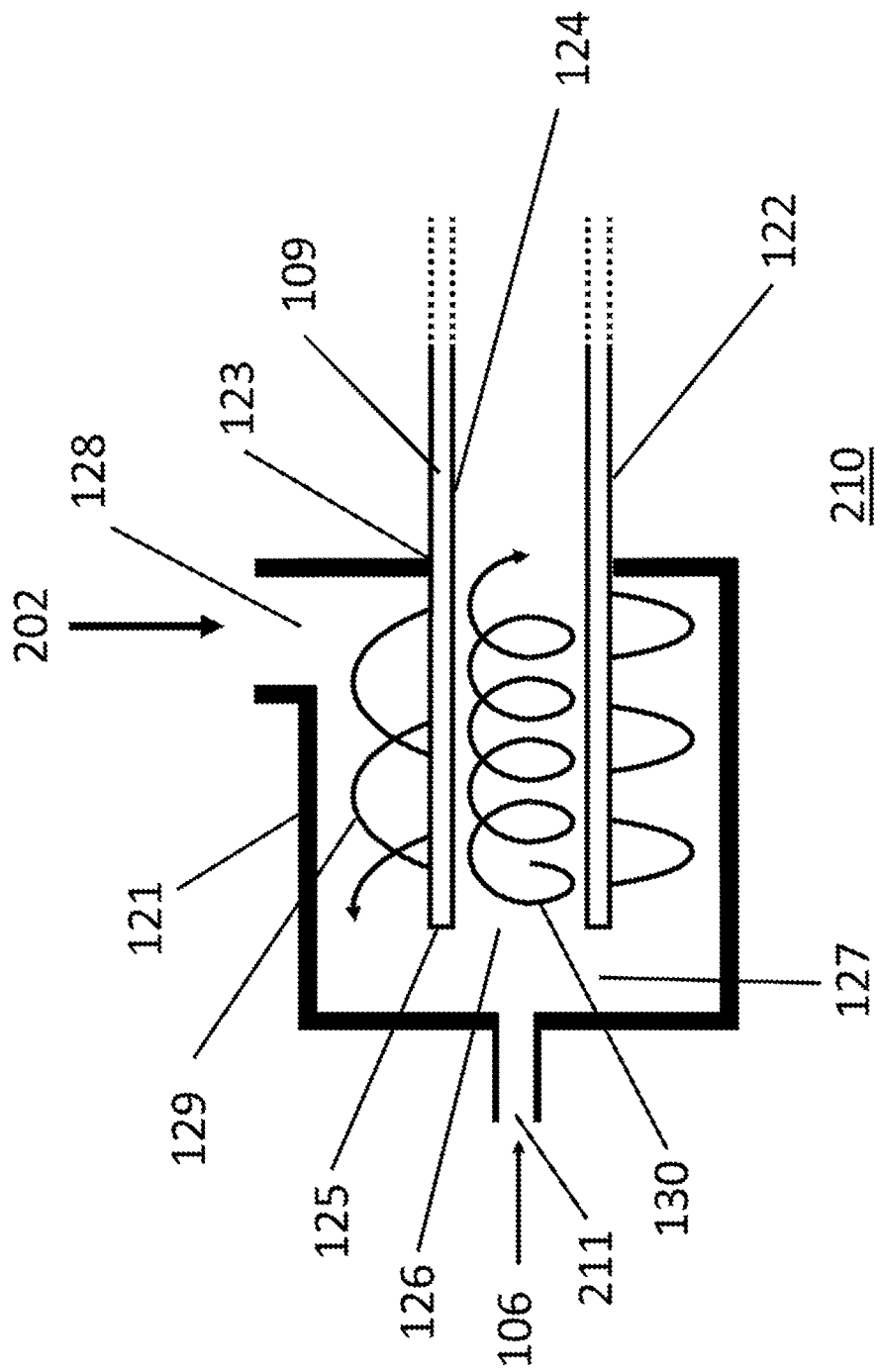
FIG. 9: Cross-sectional view of a third example tornado inlet unit.

FIG. 9 gives a cross-sectional view of a third example tornado inlet unit 210 which may serve as the tornado inlet unit 107. This example is closely related to the first example tornado inlet unit 120 (in FIG. 3), and common elements are previously described. The first portion of pre-conditioned reactants 202 enter the chamber created by the tornado chamber wall 121 and the outer surface 122 of the plasma reactor through a tornado chamber inlet 128. The catalyzed or seeded reactants 106 enter the chamber through an axial gas inlet 211. Gases injected along the axis will have the least turbulent flows, thus the catalyzed or seeded reactants 106 may be more confined to the center of the plasma reactor 109 this may help confine the plasma to the center of the plasma reactor 109.

A cross-sectional view of the third example tornado inlet unit 210 perpendicular the axis through the center of the tornado chamber inlet 128 would be very similar to that provided for the first example tornado inlet unit 120, in FIG. 4. The only notable difference is a first portion of pre-conditioned reactants 202, would flow through the tornado chamber inlet 128, instead of the catalyzed or seeded reactants 106, as shown in FIG. 4. Like the previous examples, preferably the azimuth angle 131 is between 30 and 90 degrees. While a single tornado chamber inlet 128 is shown in FIG. 4, multiple tornado chamber inlets 128 could be included. In the case where multiple tornado chamber inlets 128 are included, the azimuth angle 131 from one inlet to another may differ.

Figure 10:
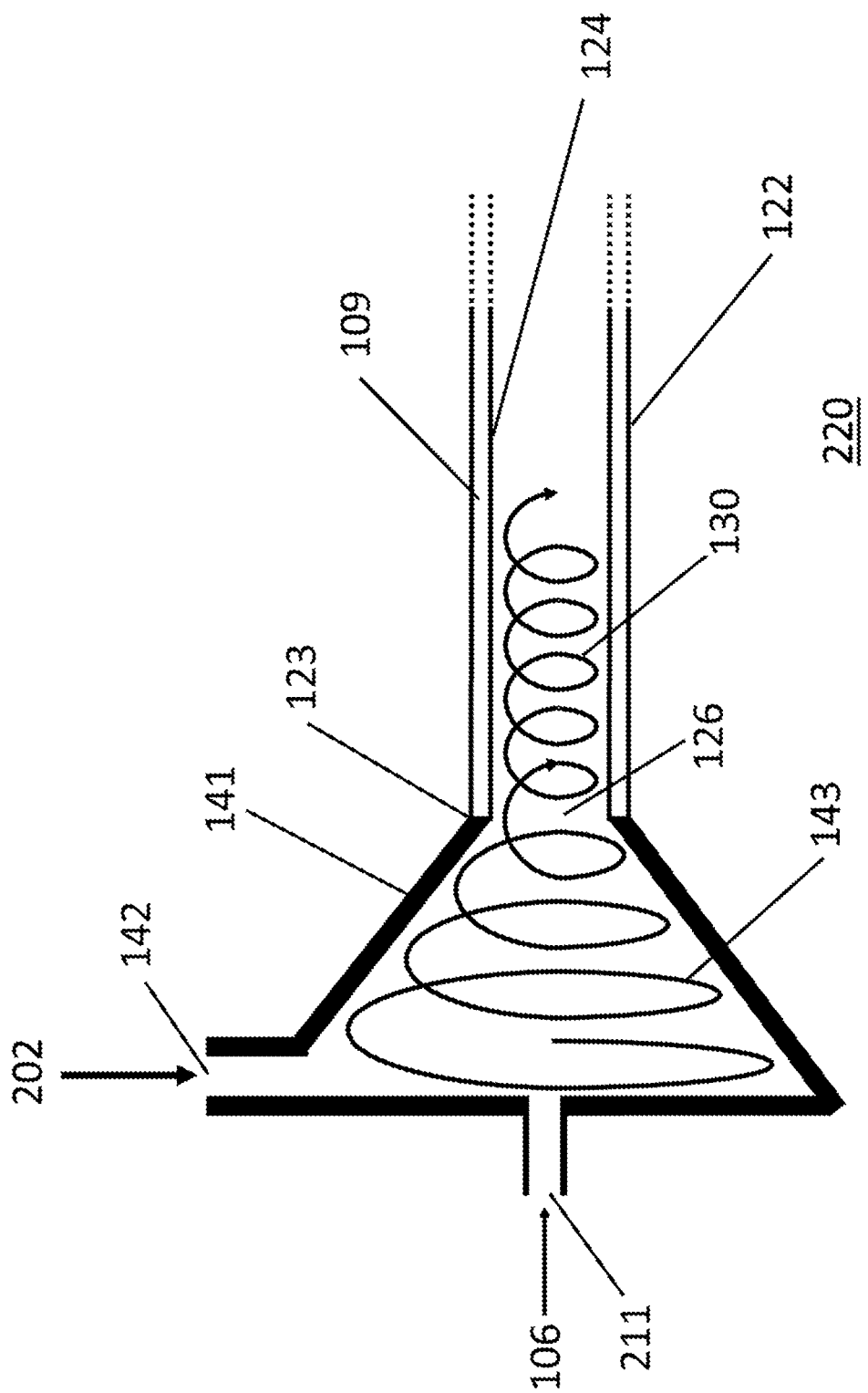
FIG. 10: Cross-sectional view of a fourth example tornado inlet unit.

FIG. 10 gives a cross-sectional view of a fourth example tornado inlet unit 220 which may serve as the tornado inlet unit 107. This example is closely related to the second example tornado inlet unit 140 (in FIG. 5), and common elements are previously described. The first portion of pre-conditioned reactants 202 enter the chamber created by the funnel-type tornado chamber wall 141 through a funnel-type tornado chamber inlet 142. The catalyzed or seeded reactants 106 enter the chamber through an axial gas inlet 211. Gases injected along the axis will have the least turbulent flows, thus the catalyzed or seeded reactants 106 may be more confined to the center of the plasma reactor 109 this may help confine the plasma to the center of the plasma reactor 109.

A cross-sectional view of the fourth example tornado inlet unit 220 perpendicular the axis through the center of the funnel-type tornado chamber inlet 142 would be very similar to that provided for the second example tornado inlet unit 140, in FIG. 6. The only notable difference is a first portion of pre-conditioned reactants 202, would flow through the funnel-type tornado chamber inlet 142, instead of the catalyzed or seeded reactants 106, as shown in FIG. 6. Like the previous examples, preferably the azimuth angle 131 is between 30 and 90 degrees. While a single funnel-type tornado chamber inlet 142 is shown in FIG. 6, multiple tornado chamber inlets 142 could be included. In the case where multiple tornado chamber inlets 142 are included, the azimuth angle 131 from one inlet to another may differ.

Preferably the tornado inlet unit 220 yield swirl velocities greater than 0.5 m/s. More preferably the tornado inlet unit 107 yield swirl velocities greater than 2 m/s.

Preferably the volume of the gases entering the tornado inlet unit 120 as a swirl gas such as the first portion of pre-conditioned reactant 202 entering through the tornado chamber inlet 128 (in FIG. 9) or the funnel-type tornado chamber inlet 142 (in FIG. 10) is at least twice as much as the volume of the gases entering the tornado inlet unit 220 as an axial gas such as the catalyzed or seeded reactants 106 entering through the axial gas inlet 211.

Embodiment 3

Figure 11:
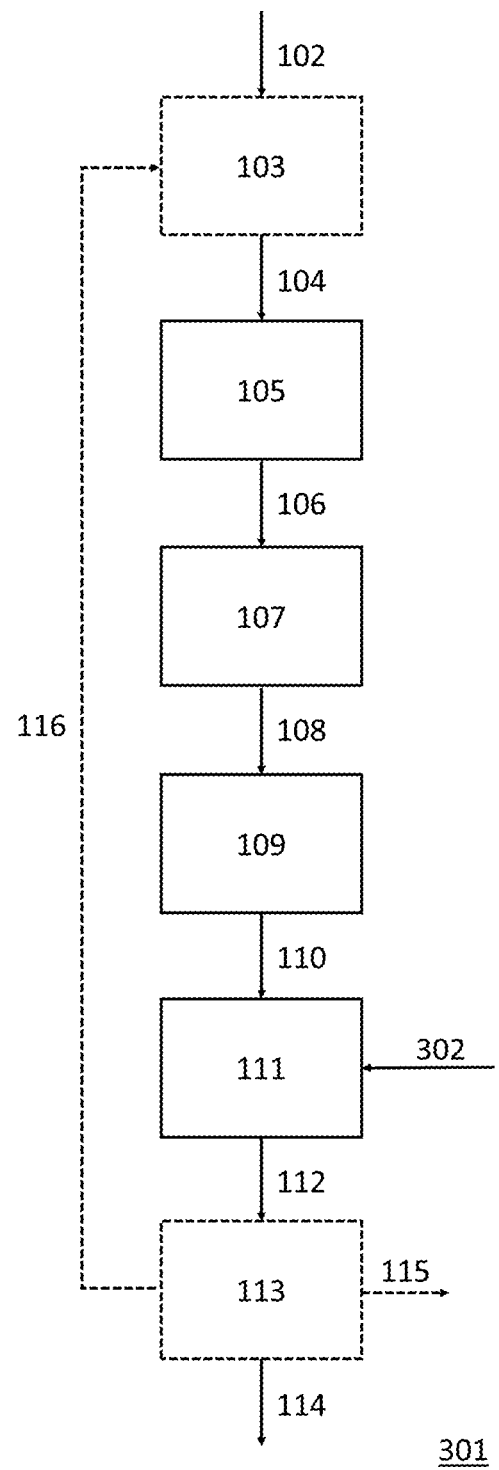
FIG. 11: Block diagram of an electron seeded plasma reactor according to the third embodiment.

FIG. 11 gives a block diagram of an electron seeded plasma reactor according to the third embodiment 301. The seeded plasma reactor according to the fourth embodiment 301 is very similar to that of the first 101. Elements with the same number perform a similar function as that those in the first embodiment. The focus will be on the differences in this particular embodiment.

In the electron seeded plasma reactor according to the second embodiment 201, secondary reactants 302 in addition to the initial product and slippage 110 enter the second stage reactor unit 111. The secondary reactants 302 may be reformed or pyrolyzed using the sensible heat within the initial product and slippage 110. Adding the secondary reactants 302 in the second stage reactor unit 111 has two main benefits 1) additional initial products may be formed without additional energy being input and 2) the generally exothermic process of reforming or pyrolyzing will cool the gases, resulting in an initial product 112 that can more easily be handled downstream.

Example Materials and Construction for Embodiment 3

Figure 12:
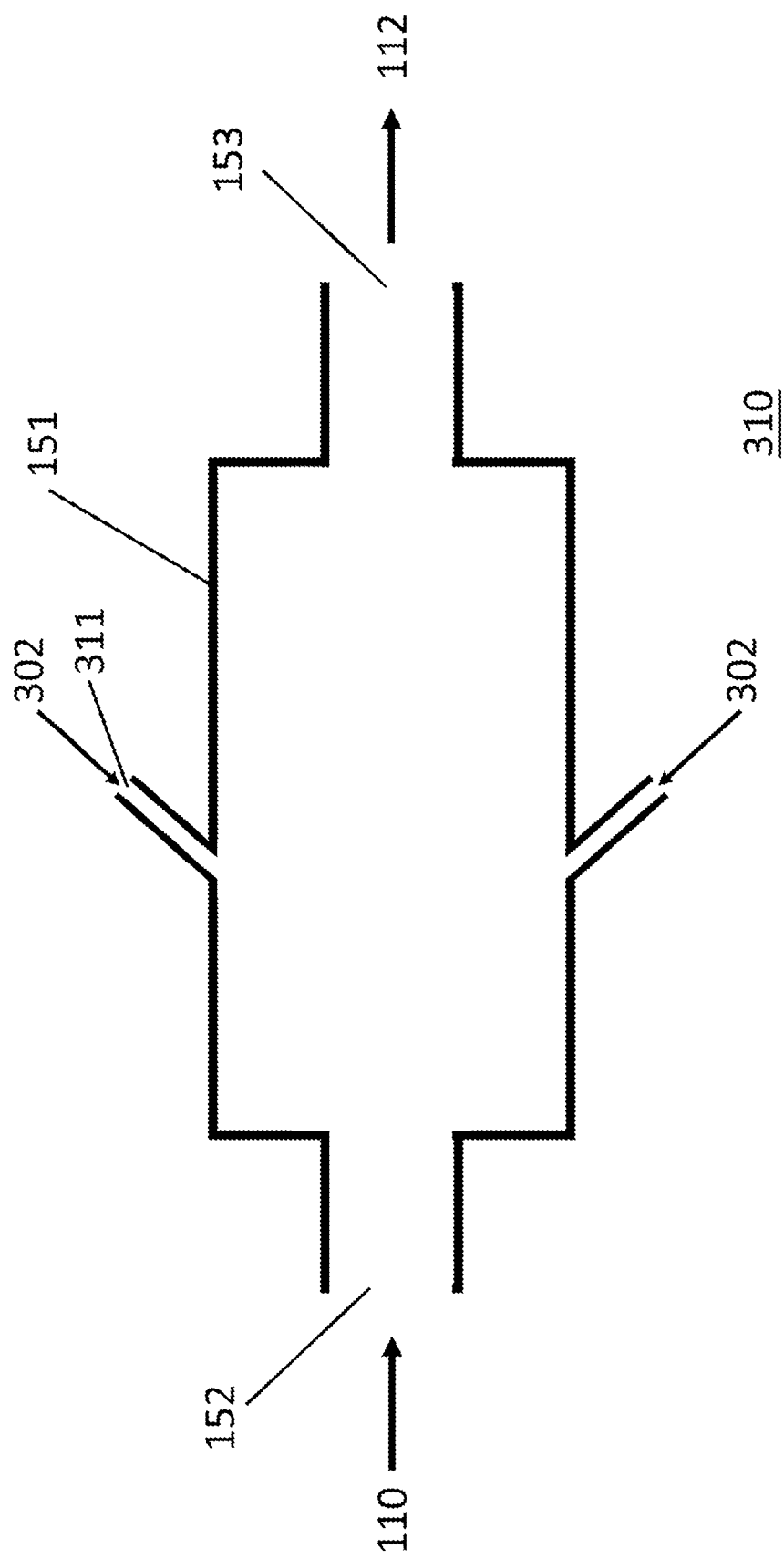
FIG. 12: Cross-sectional view of a second example second stage reactor unit.

FIG. 12 provides a cross-sectional view of a second example second stage reactor unit 310 which may serve as a second stage reactor unit 111. The second example second stage reactor unit 310 is made up of a second stage reactor wall 151 which forms an enclosed reactor chamber. Initial product and slippage 110 flow into the second example second stage reactor unit 310 through a second stage reactor inlet 152. Secondary reactants 302 enter the second example second stage reactor unit 310 through additional reactants inlets 311. The secondary reactants 302 and the slippage within the initial product and slippage 110 may further reform using the sensible heat in the initial product and slippage 110. Further the exothermic reaction of reforming and pyrolyzing will cool the gases. The initial product 112 which flows out of the second example second stage reactor unit 310 through a second stage reactor outlet 153 may have increased initial product and a cooler temperature.

While two additional reactant inlets 311 are shown in FIG. 12, more or a single inlet could also be used. Further, as shown in FIG. 12, the additional reactant inlets 311 may inject the additional reactant 161 at a non-normal angle to the axis of symmetry, although they may also be injected at an angle normal to the axis of symmetry.

The size of the second stage reactor unit 111 should be adjusted in order to optimize the composition of the initial product 112. Increasing the size will allow longer reaction times and thus may form additional desired products, however, too much time may lead to undesired recombination of the products into undesired molecules.

It is worth noting that the composition of the reactants 102 and the secondary reactants 302 may differ. In many cases, it may be preferable that they are different. For example, if the desired product is hydrogen and carbon, recycled hydrogen from tail gas 116 could be used as the reactant 102 and methane could be used as the secondary reactant 302. The methane would pyrolyze in the second stage reactor unit 111 (second example second stage reactor unit 310) forming additional hydrogen and carbon as the initial product 112. Forming carbon in the second stage reactor unit 111 will prevent carbon build up in the plasma reactor 109 and may extend the life and/or reduce down time of the plasma reactor 109.

Finally, it should be noted that the second stage reactor unit 111 may contain elements from both the first example second stage reactor unit 150 (FIG. 7) and the second example second stage reactor unit 310 (FIG. 12). A second stage reactor unit 111 having both a catalyst bed 154 (FIG. 7) and injecting secondary reactants 302 (FIG. 12) may encourage additional initial product 112 formation by incorporating catalysts which encourage product formation and effectively using the thermal energy in the initial product and slippage 110 to reform secondary reactants 302.

Embodiment 4

Figure 13:
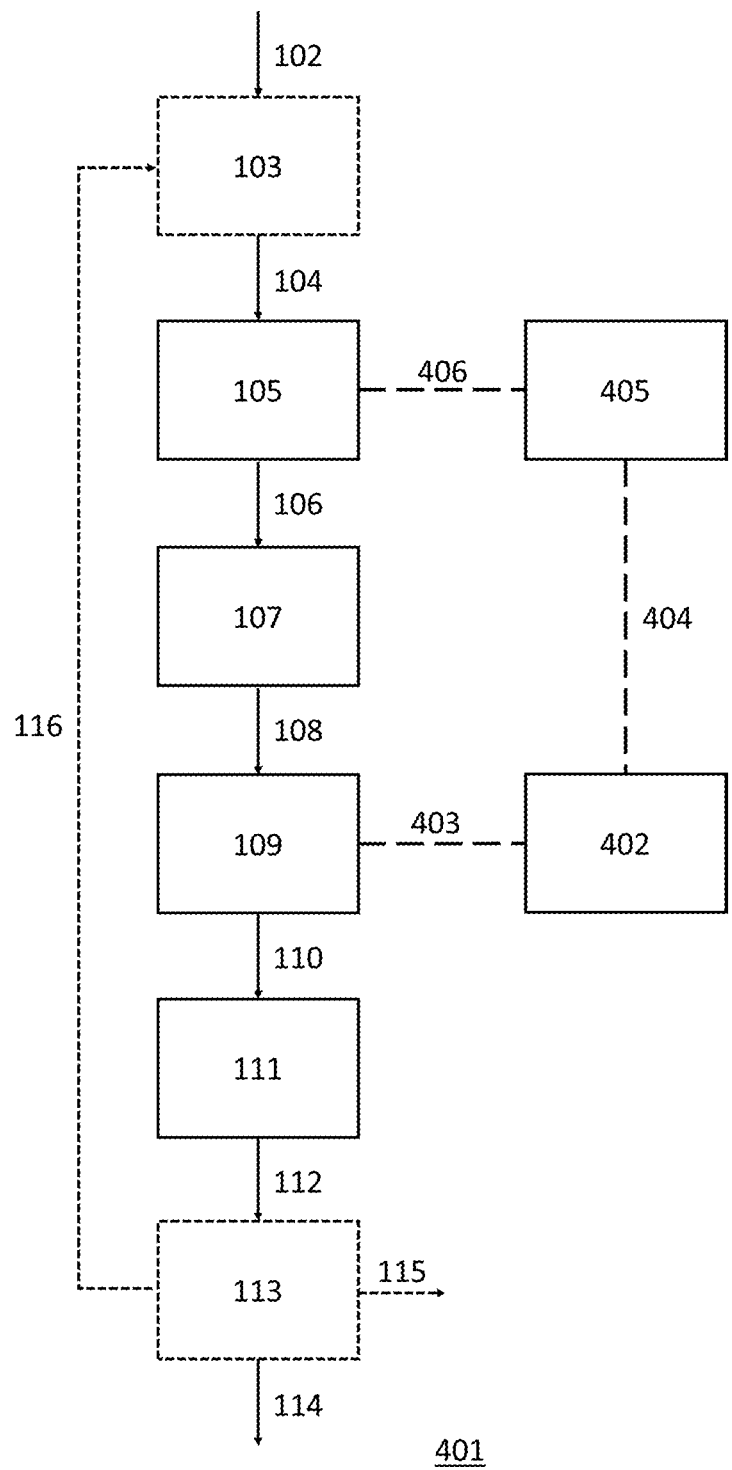
FIG. 13: Block diagram of an electron seeded plasma reactor according to the fourth embodiment.

FIG. 13 gives a block diagram of an electron seeded plasma reactor according to the fourth embodiment 401. The seeded plasma reactor according to the fourth embodiment 401 contains all the elements of the first 101. Elements with the same number perform a similar function as that those in the first embodiment. The focus will be on the differences in this particular embodiment.

The electron seeded plasma reactor according to the fourth embodiment 401 additionally includes a measurement unit 402 which makes measurements of plasma properties 403 in the plasma reactor 109. The measurement unit 402 generates measurement data 404 from the measurements of plasma properties 403. The measurement data 404 is sent to a feedback control system 405 which is configured to interpret the status of the plasma reactor 109 and either increase, decrease, or maintain the rate of catalyzing or seeding occurring in the catalyzing or seeding unit 105. Including these elements will help optimize the performance and improve the efficiency of the electron seeded plasma reactor according to the fourth embodiment 401, as only the necessary amount of catalyzing or seeding will occur.

Example Materials and Construction for Embodiment 4

The measurement unit 402 may contain a spectrometer, a photodetector, a thermocouple, and/or an ampere meter. The measurement unit 402 makes measurements of plasma properties 403, such as the electromagnetic spectrum of the plasma, the amplitude of the electromagnetic spectrum of the plasma, the temperature at a defined location near the plasma, and/or the flux of charge through the plasma and generates measurement data 404. The measurement data 404 is sent to a feedback control system 405 which may be a computer that is configured to maintain an optimum plasma condition. The feedback control system 405 uses the measurement data 404 to determine if the current rate of catalyzing or seeding in the catalyzing or seeding unit 105 needs to increase, decrease, or be maintained. The feedback control system 405 alters the seeding unit control signal 406 going to the catalyzing or seeding unit 105 to increase, decrease, or maintain the rate at which catalyzing or seeding occurs. The seeding unit control signal 406 will generally be an electrical signal used to control a portion of the catalyzing or seeding unit 105.

If the catalyzing or seeding unit 105 consists of a mass flow controller, a controlled injector, or a nebulizer configured to inject a controlled amount of an alkali salt within a solvent solution or aerosol propellant, then the seeding unit control signal 406 will increase, decrease, or maintain the rate at which the alkali salt within a solvent solution or aerosol propellant is introduced.

If the catalyzing or seeding unit 105 consists of thermionic emitter, cathode ray tubes, glow discharge, dielectric barrier discharge, microwave discharge, radio frequency discharge, corona discharge, or electric arc discharge the seeding unit control signal 406 will increase, decrease, or maintain the power applied.

In some cases, the catalyzing or seeding unit 105 may be able to be turned off once the plasma is stable. In other cases, a base level of catalyzing or seeding will be required constantly in order to maintain plasma stability. Further, in still other cases, a base level of catalyzing or seeding may be desired to improve the final product 114. For example, if natural gas is used as one of the reactants (as a methane source) small amounts of sulfur are likely to also be present, introducing a small amount of sodium in the catalyzing or seeding unit 105 will not only help stabilize the plasma but may also aid in the removal of sulfur, as the sulfur may precipitated out of the gas stream in the form of sodium sulfate.

For embodiments 1-4, it is possible to reverse the direction of the flow. Reversing the direction of the flow, while still generating swirl, requires that both ends of the plasma applicator are connected to the inlet/outlet through swirling openings. The swirling openings could be holes that are slanted (partially tangential). Preferentially, they are slanted at the outlet to minimize the pressure drop, so that the direction of the flow is aligned with the axis of the outlet holes. If this is the case, then in the reverse direction, the holes of the outlet in the reverse flow will be automatically aligned with the direction of the flow. The advantage of reversing the flows in this manner is that the valves controlling the flows can be placed at low temperature regions, for example, upstream from the optional pre-plasma conditioning unit 103 and optional post-plasma conditioning/processing unit 113. During reverse flow, the unit previously operating as the optional pre-plasma conditioning/processing unit 103 would then act as the optional post-plasma conditioning/processing unit 113, likewise the unit previously operating as the optional post-plasma conditioning/processing unit 113 would then act as the optional pre-plasma conditioning unit 103. Units 103 and 113 could be regenerators, and by reversing the direction of the flow, it is possible to both preheat the inlet gases and simultaneously cool the outlet gases. When units 103 and 113 are regenerators, the packing material in the regenerator has high heat capacity and high temperature tolerance. It can be graded, so that higher heat capacity materials are located closer to the plasma reactor 109, which is the hottest, while less expensive materials can be located further removed from the plasma reactor 109. The time required for reversing the flow (when the outlet is reaching its limit, or the inlet is becoming too cold) is determined by the mass flow rate and the heat capacity of the regenerator.

For embodiments 1-4, it would also be possible to include multiple tornado inlet units 107 and plasma reactors 109 in series. When multiple tornado inlet units 107 and plasma reactors 109 are included the initial product and slippage 110 from the first plasma reactor would flow into the tornado inlet unit of the second tornado inlet unit as the catalyzed or seeded reactant 106. Multiplexing the units in such a way may reduce the amount of slippage and make scalable plasma reforming systems.

It should be noted the various combinations of the four embodiments presented could also be made from this disclosure. It is left to one of ordinary skill in the art to pick the particular parts of each of these embodiments for a particular reforming or pyrolyzing application.

We claim:

1. A plasma reactor system for the conversion of one or more reactants into products, comprising:
   a catalyzing or seeding unit;
   a source of electrons, easily ionizable materials or both electrons and easily ionizable materials in communication with the catalyzing or seeding unit, wherein easily ionizable materials are defined as atoms and molecules having an ionization energy less than 5.5 eV;
   a tornado inlet unit having a tornado chamber inlet;
   a plasma reactor;
   and a second stage reactor unit disposed downstream from the plasma reactor;
   wherein a first portion of reactants enters the catalyzing or seeding unit, wherein the catalyzing or seeding unit introduces a flow of the electrons, the easily ionizable materials, or both the electrons and the easily ionizable materials into the first portion of reactants;
   wherein an output of the catalyzing or seeding unit is in communication with the tornado inlet unit;
   wherein a second portion of reactants enter the tornado inlet unit via the tornado chamber inlet, wherein an outlet of the tornado inlet unit yields swirl velocities and is in communication with the plasma reactor;
   wherein the plasma reactor increases the temperature of the first portion of reactants and the second portion of reactants;
   wherein the first portion of reactants and the second portion of reactants are converted into a product within the plasma reactor, the second stage reactor unit, or both the plasma reactor and the second stage reactor unit;
   and wherein the molecular composition of the first portion of reactants have a molecular composition different from that of the product.

2. The plasma reactor system of claim 1, wherein said second portion of reactants comprises methane, carbon dioxide, hydrogen, carbon dioxide and methane, or water and methane;
   and wherein said product comprises hydrogen and carbon, carbon monoxide and hydrogen, or carbon monoxide.

3. The plasma reactor system of claim 1, wherein said catalyzing or seeding unit includes a mass flow controller, a controlled injector, or a nebulizer configured to dispense a controlled amount of an alkali salt within a solvent solution or aerosol propellant, low ionization potential molecules, or a solid feed.

4. The plasma reactor system of claim 3, wherein said alkali salt comprises sodium, potassium, or cesium.

5. The plasma reactor system of claim 4, wherein said alkali salt comprises sodium;
   wherein the molar flow rate of sodium is less than 1% of the molar flow rate of both said first portion of reactants and said second portion of reactants.

6. The plasma reactor system of claim 4, wherein said alkali salt comprises potassium;
   wherein the molar flow rate of potassium is less than 0.5% of the molar flow rate of both said first portion of reactants and said second portion of reactants.

7. The plasma reactor system of claim 4, wherein said alkali salt comprises cesium;
   wherein the molar flow rate of cesium is less than 0.5% of the molar flow rate of both said first portion of reactants and said second portion of reactants.

8. The plasma reactor system of claim 1, wherein said catalyzing or seeding unit includes a thermionic emission unit, a cathode ray tube unit, a glow discharge unit, a dielectric barrier discharge unit, a microwave discharge unit, a radio frequency discharge unit, a corona discharge unit, an electric arc discharge unit, a radioactive beta decay unit, a laser ablation unit with a target comprising an alkali metal, a sputtering unit with a target comprising an alkali metal, an electrospray ionization unit, or an evaporation unit comprising an alkali metals.

9. The plasma reactor system of claim 1, wherein the first portion of reactants and the second portion of reactants enter the tornado inlet unit through the tornado chamber inlet with a large radius swirl motion and exit the tornado inlet unit with a small radius swirl motion.

10. The plasma reactor system of claim 1, wherein the first portion of reactants and the second portion of reactants enter the tornado inlet unit through the tornado chamber inlet with a large radius swirl motion which tapers to a small radius swirl motion.

11. The plasma reactor system of claim 1, where the tornado inlet unit further comprises an axial inlet;
   wherein the first portion of reactants exiting the catalyzing or seeding unit enters the tornado inlet unit through the axial inlet;
   and wherein the second portion of reactants enter the tornado inlet unit through the tornado chamber inlet with a large radius swirl motion and exit the tornado inlet unit with a small radius swirl motion, and wherein the second portion of reactants do not pass through the catalyzing or seeding unit.

12. The plasma reactor system of claim 1, where the tornado inlet unit further comprises an axial inlet;
   wherein the first portion of reactants exiting the catalyzing or seeding unit enters the tornado inlet unit through the axial inlet;
   and wherein the second portion of reactants enter the tornado inlet unit through the tornado chamber inlet with a large radius swirl motion which tapers to a small radius swirl motion, and wherein the second portion of reactants do not pass through the catalyzing or seeding unit.

13. The plasma reactor system of claim 1, further comprising a second tornado inlet unit;
   wherein the second tornado inlet unit is located downstream of the plasma reactor;
   wherein the direction of the flow through the plasma reactor can be switched.

14. The plasma reactor system of claim 1, further comprising a second tornado inlet unit and a second plasma reactor unit;
   wherein the product formed in said plasma reactor flows through the second tornado inlet unit into the second plasma reactor unit.

15. The plasma reactor system of claim 1, wherein the second stage reactor unit comprises a catalyst bed.

16. The plasma reactor system of claim 15, wherein the catalyst bed comprises a metal material.

17. The plasma reactor system of claim 1, wherein the second stage reactor unit further comprises a reactant inlet through which a secondary reactant flows.

18. The plasma reactor system of claim 17, wherein said secondary reactant comprises methane, carbon dioxide, hydrogen, carbon dioxide and methane, water and methane, or water.

19. The plasma reactor system of claim 17, wherein the second stage reactor unit further contains a catalyst bed comprising a metal material.

20. The plasma reactor system of claim 17, wherein a portion of said first portion of reactants, second portion of reactants, or secondary reactants contain a tail gas that originates from a downstream process.

21. The plasma reactor system of claim 1, wherein the pressure within said plasma reactor is between 0.95 and 5 atm.

22. The plasma reactor system of claim 1, further comprising a feedback control system;
   wherein said feedback control system measures properties of said plasma reactor and controls the flow rate with which said flow of electrons, easily ionizable materials, or both electrons and easily ionizable materials enter said catalyzing or seeding unit.

23. The plasma reactor system of claim 22, wherein said feedback control system measures changes of properties of said plasma reactor due to fluctuation in power delivered to said plasma reactor and controls the flow rate with which said flow of electrons, easily ionizable materials, or both electrons and easily ionizable materials enter said catalyzing or seeding unit.

24. The plasma reactor system of claim 1, wherein an energy source in the plasma reactor comprises a microwave discharge.

25. The plasma reactor system of claim 1, wherein the swirl velocities are in excess of 0.5 m/s.

* * * * *